United States Patent

Grimm

[15] 3,670,796

[45] June 20, 1972

[54] FASTENING DEVICE WITH CAPTIVE, AXIAL FLOATING NUT

[72] Inventor: David W. Grimm, Watchung, N.J.

[73] Assignee: Amerace Esna Corporation, New York, N.Y.

[22] Filed: Dec. 2, 1969

[21] Appl. No.: 881,555

[52] U.S. Cl. ..................................................151/41.75
[51] Int. Cl. .......................................................F16b 41/00
[58] Field of Search ...............151/41.75, 41.76, 41.7, 41.71, 151/41.73

[56] References Cited

UNITED STATES PATENTS

| 3,020,947 | 2/1962 | McKelvey | 151/41.75 |
| 3,118,480 | 1/1964 | Kreider | 151/41.75 |
| 3,145,753 | 8/1964 | Kreider | 151/41.75 |

FOREIGN PATENTS OR APPLICATIONS

| 868,086 | 5/1961 | Great Britain | 151/41.75 |
| 1,236,404 | 6/1960 | France | 151/41.75 |

Primary Examiner—Marion Parsons, Jr.
Attorney—Samuelson & Jacob

[57] ABSTRACT

A fastening device such as a clip-nut in which the nut is free to move axially relative to the clip, the axial displacement of the nut being at least of the order of magnitude of the length of travel of the nut necessary to effectively thread the nut upon a mating screw and bring the clamping surface of the nut into clamping engagement against the workpiece to which the clip-nut is affixed such that upon initial insertion of the screw into the clip-nut, axial movement of the portion of the clip which holds the nut captive is limited to no more than that which will only deflect the clip resiliently.

8 Claims, 7 Drawing Figures

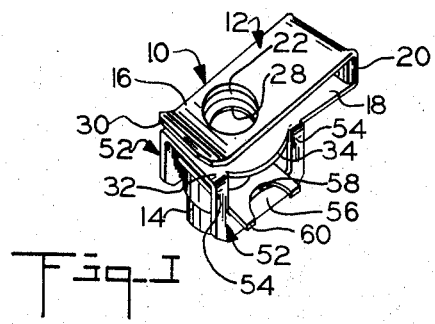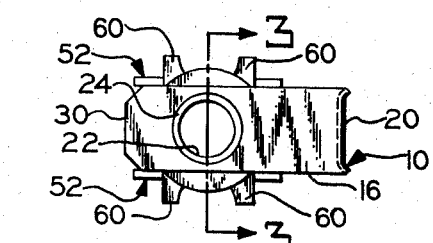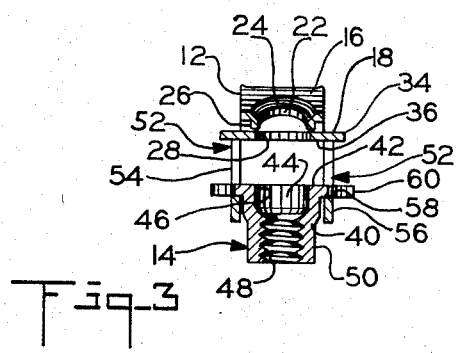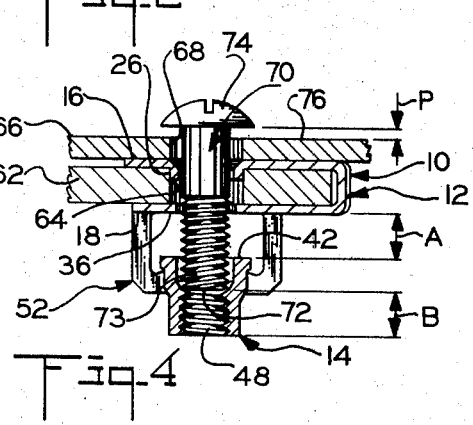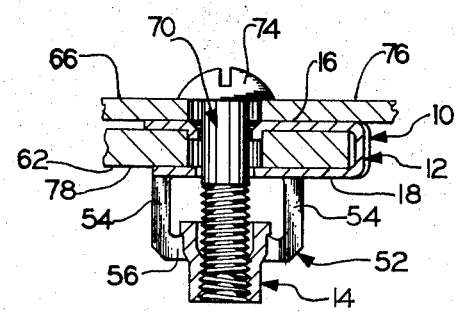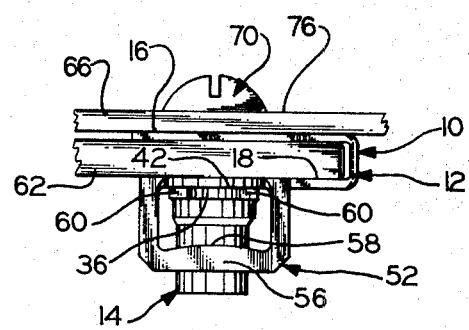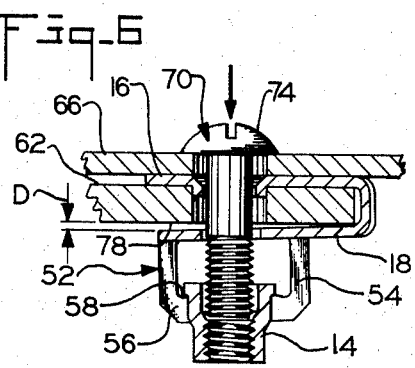
INVENTOR.
DAVID W. GRIMM
BY
Samuelson & Jacob
HIS ATTORNEYS

FASTENING DEVICE WITH CAPTIVE, AXIAL FLOATING NUT

The present invention relates generally to fastening devices of the type which may be attached to an apertured workpiece and retained on the workpiece to provide the workpiece with means for receiving a complementary threaded fastener and pertains, more specifically, to nuts commonly known as clip-nuts.

Fastening devices such as clip-nuts are presently used extensively where it is desired to attach a nut to an apertured workpiece, such as a plate with an opening therein, so that a screw received within the opening may be employed to assemble a complementary workpiece with the plate. Ordinarily, such devices are provided with a resilient retainer or clip upon which there is held captive a nut, and the retainer is provided with some securing means for attaching the device to the plate.

In a clip-nut, the retainer is in the form of a clip which may be resiliently deflected, or opened, to receive the plate and to allow the securing means to be located at the opening, at which point the clip will snap the securing means into engagement with the opening to retain the clip upon the plate with the nut held in general alignment with the opening for the reception of a screw passed through the opening.

In many instances, and particularly where power-driven screw drivers are employed in assembling screws with clip-nuts or other such devices already in place upon apertured plates, it has been observed that the screw is thrust axially through the opening and against the nut, prior to threading the screw into the nut, with such force that the nut is urged away from the plate causing excessive bending of the clip in a direction which tends to open the clip. Where such bending exceeds the limit of elastic or resilient deflection of the clip, the clip will be permanently deformed in an open configuration so that upon disassembly of the screw and the nut, the clip will no longer return to its original configuration and the nut will no longer be retained in axial alignment with the opening. Additionally, the securing means will no longer engage the opening, and the clip will become loose and fall from the plate, taking with it the nut. Thus, the basic purpose of the clip-nut, which is to retain a nut in place upon a workpiece and in proper alignment for repetitive engagement with a mating screw, is thwarted.

It is therefore an important object of the invention to provide a fastening device of the type which attaches a nut to a workpiece and which will effectively resist misalignment of the nut with respect to the workpiece or detachment from the workpiece as a result of axial thrusts applied to the nut by a mating screw during assembly operations.

Another object of the invention is to provide a fastening device such as a clip-nut which is constructed to compensate for the axial thrust of a mating screw during assembly operations so that such thrust will not result in disengagement of the clip-nut from the workpiece to which the nut is attached or misalignment of the nut with respect to the workpiece.

Still another object of the invention is to provide a clip-nut wherein the nut is held captive upon the clip, but may be displaced axially relative to the clip through a limited displacement sufficient to preclude bending of the clip beyond the limit of elastic or resilient deflection of the clip as a result of the axial thrust of a mating screw upon the nut during assembly operations.

A further object of the invention is to provide a clip-nut of the type described above which is easy to install and use and which is relatively inexpensive to manufacture.

The above objects, as well as still further objects and advantages, are attained by the invention which may be described briefly as providing in a fastening device such as a clip-nut of the type wherein a nut is held captive in an elastically deflectable retainer for attachment to a workpiece having an opening therein, the fastening device having an aperture for alignment with the opening and means capturing the nut in substantial axial alignment with the aperture for reception of a screw passing through the opening, the improvement comprising means for permitting axial displacement of the nut relative to the retainer, the axial displacement being at least of the order of magnitude of the length of travel of the nut necessary to thread the nut into effective threaded engagement with the screw and to bring the nut into clamping engagement with respect to the workpiece such that upon insertion and advancement of the screw through the aperture, and against the nut, axial movement of the capturing means in limited to no more than that which will deflect the retainer elastically.

The invention will be more fully understood, while still further objects and advantages will become apparent, in the following detailed description of an embodiment of the invention illustrated in the accompanying drawing, in which:

FIG. 1 is a perspective view of a fastening device in the form of a clip-nut constructed in accordance with the invention;

FIG. 2 is a top plan view of the clip-nut of FIG. 1;

FIG. 3 is a cross-sectional view taken along line 3—3 of FIG. 2;

FIG. 4 is a cross-sectional elevational view illustrating the clip-nut installed upon a workpiece, and a complementary workpiece about to be fastened thereto with a mating screw;

FIG. 5 is similar to FIG. 4, but illustrates the screw thrust against the nut of the clip-nut;

FIG. 6 is similar to FIG. 5, but shows the nut as it is being threaded upon the screw;

FIG. 7 is an elevational view of the items illustrated in FIGS. through 6, but showing the workpieces fastened together with the nut in clamping engagement upon the screw.

Referring now to the drawing, and especially to FIGS. 1 through 3 thereof, a fastening device in the form of a clip-nut constructed in accordance with the invention is designated generally at 10 and is seen to include a clip 12 upon which there is held captive a nut 14.

The clip 12 is provided with a first arm which, in this instance, is an upper arm 16, and a second arm, shown in the form of lower arm 18. The arms 16 and 18 are interconnected at one end thereof by a web 20. The clip 12 is constructed of a resilient material such as a metal, preferably steel, so that the arms 16 and 18 may be elastically deflected away from one another for purposes which will be explained hereinafter.

The upper arm 16 is provided with an aperture 22 having a chamfer 24 at the entrance end of the aperture. Adjacent the opposite end of the aperture 22 there is provided a securing means shown in the form of a lip 26 projecting downwardly from the underside of the upper arm. The lower arm 18 is also provided with an aperture, shown as aperture 28, the aperture 28 being somewhat larger in diameter than the aperture 22 in the upper arm 16 and both apertures 22 and 28 being in axial alignment with one another.

The upper arm 16 is flared upwardly slightly with respect to the lower arm 18 at the end 30 opposite the end which is attached to the lower arm by the web 20 so as to provide an open mouth 32 at the entrance to the clip 12. In addition, the lower arm 18 of clip 12 includes a washer-like portion 34 surrounding the aperture 28 therein and having a downwardly facing clamping surface 36.

The nut 14 includes a generally tubular body 40 having a clamping surface 42 facing upwardly toward the complementary clamping surface 36 of the lower arm 18 and an axial bore 44 including a pilot portion 46 and an internal helical thread 48 extending axially from the pilot portion 46 through the remainder of the bore 44. If desired, the tubular body 40 may be permanently deformed into an out-of-round configuration along the internally threaded portion 50 thereof in order to provide a prevailing torque type self-locking mechanism in the nut 14.

In order to capture the nut 14 upon the clip 12, means are provided in the form of a pair of U-shaped members 52 depending downwardly from the lower arm 18, each U-shaped member 52 including a pair of axially extending legs 54 interconnected at the extremities thereof by a transverse element 56 which provides a shelf 58 spaced axially from the lower arm 18 of the clip 12 by the length of the legs 54. The nut 14 is provided with lateral projections 60, here shown flush with the clamping surface 42, each projection 60 extending laterally between the legs 54 of a U-shaped member 52 and resting upon a shelf 58 to retain the nut upon the lower arm 18 of the clip 12 with the axial bore 44 of the nut 14 in general alignment with the apertures 22 and 28 in the arms of the clip. The shelves 58 are curved (see FIG. 7) to permit some rocking of the axis of the nut relative to the lower arm 18 and the U-shaped members 52.

In the illustrated construction of clip-nut 10, the U-shaped members 52 are integral with the lower arm 18 of the clip 12 by virtue of the unitary structure which includes the upper and lower arms 16 and 18 of the clip as well as the U-shaped members. Thus, the clip may be formed with the U-shaped members and the washer-like portion 34 of the lower arm initially lying in the same plane and then the U-shaped members may be bent downwardly to extend perpendicular to the plane of the washer-like portion to capture the lateral projections 60 of the nut 14 in a simple and effective manner. The nut is free to move axially between a lower portion where the projections rest upon the shelves 58 of the transverse elements 56 and an upper position where the clamping surface 42 of the nut will engage the complementary clamping surface 36 of the lower arm 18 of the clip 12.

Turning now to FIGS. 4 through 7, a clip-nut 10 is installed upon an apertured workpiece by inserting the workpiece, here shown in the form of a plate 62 having an opening 64 therein, into the mouth 32 of the clip 12 between the flared end 30 of the upper arm 16 and the corresponding end of the lower arm 18 of the clip, the flared end 30 facilitating such insertion. By virtue of the insertion of the plate 62, the upper and lower arms 16 and 18 of the clip 12 will be resiliently deflected away from one another until the lip 26, which depends from the upper arm 16, is located in alignment with the opening 64 in the plate. At the point where the lip 26 is aligned with the opening 64, the lip will be snapped into the opening to secure the clip in place on the plate with the nut 14 retained in general axial alignment with the opening 64.

A complementary apertured workpiece, shown in the form of a sheet 66 with an opening 68 therein may be secured to the plate 62 by aligning the openings 64 and 68 and inserting a screw 70 through the openings in the workpieces and through the apertures 22 and 28 in the clip 12. As best seen in FIG. 4, the mere insertion of the screw 70, prior to any turning of the screw, will allow the screw to enter pilot portion 46 of the axial bore 44 of the nut 14 and will bring the lower end 72 of the external thread 73 of the screw into contact with the upper end of the internal thread 48 of the nut 14, leaving a space P between the head 74 of the screw 70 and the upper surface 76 of the sheet 66. Further downward axial movement of the screw 70 without turning of the screw results in the downward deflection D of the lower arm 18 of the clip 12 away from the lower surface 78 of plate 62, as seen in FIG. 5, until the head 74 of the screw is seated upon the upper surface 76 of the sheet. Should such deflection of the lower arm 18 of the clip 12 be excessive, that is, should the lower arm of the clip be bent downwardly far enough beyond the limit of elastic deflection of the lower arm, the clip will be permanently deformed such that upon removal of the screw 70 the nut 14 will no longer be in proper axial alignment with the openings 64 and 68. Under severe bending, the lip 26 will no longer be resiliently biased into the opening 64 in the plate 62 and the clip will become loose and will readily fall from the plate when the screw 70 and the sheet 66 are disassembled from the plate and the clip.

In order to preclude excessive deflection of the lower arm 18, the transverse elements 56 of the U-shaped members 52 are spaced from the lower arm a distance sufficient to limit the space P so that space P does not exceed a distance which corresponds to the amount of deflection of lower arm 18 that can be tolerated by the clip 12; that is, the amount of deflection from which the lower arm can still return to a position where the clip will remain effective to retain the nut in place upon the plate 62 and in proper alignment with openings 64 and 68. Such deflection is referred to herein as resilient deflection. It is noted, however, that the space P must be great enough to enable the external thread 73 of the screw 70 to start threading its way into the internal thread 48 of the nut 14 upon commencement of the turning of the screw. Hence, space P cannot be reduced to zero.

As the screw 70 is turned, the nut 14 will begin to travel upwardly along the thread of the screw and, as best seen in FIG. 6, the lower arm 18 of the clip 12 will return to its undeflected position against the lower surface 78 of the plate 62. Such travel of the nut will continue until the clamping surface 42 of the nut is in clamping engagement with the corresponding clamping surface 36 of the washer-like portion 34 of the lower arm 18 and the sheet 66 and plate 62 are clamped together in assembled relationship, as seen in FIG. 7. The curved configuration of shelves 58 enables the nut to be rocked relative to the U-shaped members 52 in order to facilitate insertion of the screw, deflection of the clip and threading of the nut along the screw, as described above. Alternately, the shelves may be straight and the projections 60 may be curved in order to accomplish the same purpose. Rotation of the nut 14 with rotation of the screw 70 is precluded by engagement of the lateral projections 60 of the nut with the depending legs 54 of the U-shaped members 52.

In a properly designed screw and nut assembly, effective threaded engagement of complementary threads requires that the thread of the screw engage the thread of the nut along the entire length of the thread of the nut. Thus, in the assembly shown in FIGS. 4 through 7, the distance between the clamping surface 43 of the nut 14 and the corresponding clamping surface 36 of the lower arm 18 (see FIG. 4) should be of the order of magnitude of the length of travel of the nut necessary to thread the nut along the screw until the screw is fully engaged within the nut or, in other words, the axial distance A between the clamping surface of the nut and the corresponding clamping surface of the lower arm should be approximately equal to the axial length B of the thread of the nut. However, since there is some minimal space P required in order to properly start the screw in the nut, and since such spacing will produce a corresponding deflection D in the lower arm of the clip which will be taken up as the nut travels along the screw, the distance A may be smaller than the length B by an amount equal to space P. Since the space P is advantageously equal to the length of approximately one thread pitch, the distance A is advantageously made equal to the total axial length B of the thread of the nut, less the axial length of one thread pitch. Of course, the magnitude of distance A is directly related to the total length of the shank of the screw 70, while the magnitude of space P is limited by the amount of deflection D which can be tolerated by the lower arm of the clip. Under ordinary conditions, the screw shank would not be any longer than that which would be necessary to engage the full length of the thread of the nut (as illustrated in FIGS. 4 through 7). In some instances, however, it is desirable to increase the length of the screw so that when the screw and the nut are in the fully assembled position, with the nut in clamping engagement with respect to the workpieces, the screw will extend beyond the nut for a length equal to one or two thread pitch lengths. In such an instance, the distance A would be increased by the increased length of the screw shank in order to compensate for the extra length in the screw shank. Hence, while the distance A must be at least equal to the length B of the thread of the nut, less some minimal amount necessary to properly start the screw in the nut (preferably the length of one thread pitch), the distance A may be increased where the length of the screw is increased, and by an amount corresponding to the increase in the length of the screw.

Thus, it will be seen that by permitting axial displacement of the nut 14 relative to the clip 12 and by choosing the order of magnitude of that displacement in accordance with the above parameters, axial thrust upon the screw 70 during installation of the screw will not have the effect of bending the clip into a permanently deformed state which might push the nut permanently out of alignment with the openings in the workpieces or tend to loosen the engagement of the clip-nut 10 with the plate 62, but will merely resiliently deflect the clip so that the clip can largely recover its initial configuration and remain secured to the plate upon disassembly of the sheet 66 and the screw from the plate and the clip-nut with the nut in alignment for proper reception of the screw.

It is to be understood that the above detailed description of an embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A clip-nut for locating and retaining a nut in alignment within an opening in a workpiece to receive a screw advanced through the opening, said clip-nut comprising:
   a clip including a first arm having a first aperture therein and a second arm juxtaposed with said first arm and integral therewith, said second arm having a second aperture aligned axially with said first aperture, said first and second arms being capable of resilient deflection away from one another to receive said workpiece between the first and second arms with said apertures in alignment with the opening in the workpiece;
   a nut having a tubular body with an internally threaded axial bore in which the thread extends axially along a substantial portion of the bore and includes a plurality of convolutions along the axial length of the thread, said body including a clamping surface; and
   means capturing the nut upon one of said first and second arms for axial displacement between a first position wherein the clamping surface of the nut is spaced axially from said one arm and a second position wherein the clamping surface of the nut is in clamping engagement with respect to said one arm;
   the axial spacing between the clamping surface of the nut and the one arm when the nut is in said first position being at least in the order of magnitude of the length of travel of the nut necessary to thread the entire length of the thread of the nut into engagement with the screw and to bring the nut into said second position without exceeding the limit of resilient deflection available between the first and second arms when the clip-nut is installed upon the workpiece.

2. The clip-nut of claim 1 wherein said axial spacing is at least equal to the length of travel of the nut necessary to thread the entire length of the thread of the nut along the screw to bring the clamping surface of the nut into clamping engagement less the available resilient deflection of the arms away from one another beyond that deflection which enables retention of the workpiece between said arms.

3. The clip-nut of claim 1 wherein said axial spacing is at least approximately the same as the total axial length of the thread of the nut, less an amount sufficient to enable starting of the screw in the nut.

4. The clip-nut of claim 1 wherein said axial spacing is at least equal to the total axial length of the thread of the nut less the axial length of one thread pitch.

5. The clip-nut of claim 1 wherein:
   said capturing means include a pair of opposed U-shaped members integral with said one arm, each U-shaped member having a pair of legs extending axially from said one arm and a transverse element spaced axially from said one arm and interconnecting said pair of legs; and
   the nut is located between the U-shaped members and includes opposite projections, each projection extending laterally between the pair of legs of a U-shaped member to capture the nut upon said one arm between the U-shaped members axially between said first position of the nut where the projections engage said transverse elements, and the second position of the nut.

6. The clip-nut of claim 5 wherein said axial displacement is at least equal to the length of travel of the nut necessary to thread the entire length of the thread of the nut along the screw to bring the clamping surface of the nut into clamping engagement less the available resilient deflection of the arms away from one another beyond that deflection which enables retention of the workpiece between said arms.

7. The clip-nut of claim 5 wherein said axial spacing is at least approximately the same as the total axial length of the thread of the nut, less an amount sufficient to enable starting of the screw in the nut.

8. The clip-nut of claim 5 wherein said axial spacing is at least equal to the total axial length of the thread of the nut less the axial length of one thread pitch.

* * * * *